(12) United States Patent
Park et al.

(10) Patent No.: US 11,219,237 B2
(45) Date of Patent: Jan. 11, 2022

(54) APPARATUS FOR ROASTING GREEN BEAN

(71) Applicant: TECUM CO., LTD., Seoul (KR)

(72) Inventors: Jae Wook Park, Seoul (KR); Dong Ki Park, Seoul (KR)

(73) Assignee: TECUM CO., LTD., Seoul (KR)

( * ) Notice: Subject to any disclaimer, the term of this patent is extended or adjusted under 35 U.S.C. 154(b) by 565 days.

(21) Appl. No.: 16/303,625

(22) PCT Filed: Apr. 26, 2017

(86) PCT No.: PCT/KR2017/004394
§ 371 (c)(1),
(2) Date: Nov. 20, 2018

(87) PCT Pub. No.: WO2018/026089
PCT Pub. Date: Feb. 8, 2018

(65) Prior Publication Data
US 2020/0305493 A1    Oct. 1, 2020

(30) Foreign Application Priority Data
Aug. 4, 2016 (KR) ........................ 10-2016-0099579

(51) Int. Cl.
*A23N 12/08* (2006.01)
*A23F 5/04* (2006.01)
(Continued)

(52) U.S. Cl.
CPC .............. *A23N 12/083* (2013.01); *A23F 5/04* (2013.01); *A23F 5/16* (2013.01); *A23N 12/125* (2013.01)

(58) Field of Classification Search
CPC .......... A23F 5/04; A23F 5/16; A23N 12/083; A23N 12/125

USPC ......... 99/469, 348, 403, 409, 327, 330–333, 99/325, 345–347, 451, 468, 473, 470, 99/483; 426/18, 19, 25, 253, 299, 302,
(Continued)

(56) References Cited

U.S. PATENT DOCUMENTS

| | | | | |
|---|---|---|---|---|
| 2,109,597 A | * | 3/1938 | Richeson | A23N 12/10 99/335 |
| 2,185,878 A | * | 1/1940 | Adams | A23N 12/083 34/527 |
| 4,196,342 A | * | 4/1980 | Chailloux | A23N 12/08 219/385 |

FOREIGN PATENT DOCUMENTS

| | | |
|---|---|---|
| JP | 11075797 A * | 3/1999 |
| KR | 20-0426653 Y1 | 9/2006 |

(Continued)

*Primary Examiner* — Dana Ross
*Assistant Examiner* — Ket D Dang
(74) *Attorney, Agent, or Firm* — Rabin & Berdo, P.C.

(57) ABSTRACT

The present invention relates to an apparatus for roasting green beans. The apparatus for roasting green beans according to an embodiment of the present invention comprises: a roasting kettle in which a roasting portion responsible for roasting green beans is formed; a heating member for heating the roasting kettle during roasting, the heating member being embedded in a heating hole formed in the roasting kettle and integrated with the roasting kettle; and a stirring device which is rotatably mounted inside the roasting kettle and stirs green beans during roasting. By providing heating to the roasting kettle during green bean roasting, the heating member embedded in the heating hole formed in the roasting kettle therefore enables more efficient roasting, resulting in a great decrease in the roasting time of green beans.

10 Claims, 8 Drawing Sheets

(51) Int. Cl.
*A23F 5/16* (2006.01)
*A23N 12/12* (2006.01)

(58) Field of Classification Search
USPC ....... 426/303, 640, 441, 461, 465–473, 486,
426/510–511; 366/135, 145, 146, 185,
366/187, 194, 200, 204, 205, 222–224,
366/213, 232; 219/436, 439
See application file for complete search history.

(56) References Cited

FOREIGN PATENT DOCUMENTS

| | | |
|---|---|---|
| KR | 10-2012-0106158 A | 9/2012 |
| KR | 10-2012-0133773 A | 12/2012 |
| KR | 10-1217086 B1 | 12/2012 |
| KR | 10-1248566 B1 | 3/2013 |
| KR | 10-1351533 B1 | 1/2014 |
| KR | 10-2014-0082372 A | 7/2014 |
| KR | 10-2016-0051255 A | 5/2016 |

\* cited by examiner

APPARATUS FOR ROASTING GREEN BEAN

TECHNICAL FIELD

The present disclosure relates to an apparatus for roasting green beans. More particularly, the present disclosure relates to an apparatus for roasting green beans, the apparatus having a structure including a heating member embedded in a roasting kettle for roasting green beans to reduce a roasting time through efficient roasting.

BACKGROUND ART

In general, roasted coffee beans are produced by exposing green beans to heat during roasting. When the tissues of green beans are maximally expanded by heat applied thereto, the cell tissues of green beans are destroyed, so that components of coffee beans, such as oil, moisture, fiber, glucide, caffeine, organic acids, and tannin, are exposed.

In other words, since green beans are simple hard seeds without taste or flavor, coffee beans must be subjected to roasting to produce drinkable coffee. It is important to understand the characteristics of green beans, such as a harvest time, moisture content, density, seed type, and processing method. Since the characteristics of green beans vary, depending on conditions, such as changes in the natural environment and the state of storage, experience and skills are required to produce coffee having an optimum taste and flavor.

Describing recent coffee roasting processes, coffee beans are automatically roasted when a roasting mode is set using a temperature sensor and a microcomputer.

Roasted coffee beans are prepared by a process of roasting green beans, a process of peeling the skins of roasted coffee beans, a process of discharging coffee beans, and a process of cooling discharged coffee beans.

Since the taste and flavor of roasted coffee beans may be significantly degraded when a long period of storage has passed after roasting, a variety of green bean roasting apparatuses have recently been distributed to allow green beans to be directly roasted at coffee shops or the like.

Such roasting apparatuses have been proposed in various examples, such as "GREEN BEAN ROASTING DEVICE OF COFFEE MACHINE," disclosed in Korean Patent No. 10-1248566, and "COFFEE ROASTER AND ROASTING CONTROL METHOD," disclosed in Korean Patent No. 10-1217086.

However, the foregoing related-art solutions have significantly low heating efficiencies, since a bean-roasting heating member is provided separately from a kettle for roasting green beans.

In addition, since the skins peeled from green beans during roasting are not properly discharged, coffee beans may not be uniformly roasted. It is impossible to extract high-quality coffee from such coffee beans, which is problematic.

DISCLOSURE

Technical Problem

Various aspects of the present disclosure provide an apparatus for roasting green beans, having a structure including a heating member embedded in a roasting kettle to significantly reduce a roasting time, so that roasting can be efficiently performed.

Also provided is an apparatus for roasting green beans, having a structure automatically discharging the skins of green beans during the roasting of green beans, so that green beans can be uniformly roasted.

Technical Solution

In consideration of the above-described problems, an apparatus for roasting green beans according to an embodiment of the present disclosure may include:
a roasting kettle having a roasting portion in an internal portion thereof, wherein green beans are roasted in the roasting portion;
a heating member embedded in a heating-hole provided in the roasting kettle and integrated with the roasting kettle, the heating member heating the roasting kettle during roasting; and
a stirrer rotatably disposed within roasting kettle to stir green beans during roasting.

In addition, an apparatus for roasting green beans according to an embodiment of the present disclosure may include:
a roasting housing including a roasting kettle having a roasting portion in an internal portion thereof, wherein green beans are roasted in the roasting portion, and a roasting cover surrounding an outer circumferential surface of the roasting kettle to circulate and discharge cold air;
a heating member embedded in a heating-hole provided in the roasting kettle and integrated with the roasting kettle, the heating member heating the roasting kettle during roasting;
a cooler connected to a bottom portion of the roasting cover to provide cold air to cool the roasting housing;
a stirrer rotatably disposed within the roasting kettle to stir green beans during roasting; and
a bean discharger including a discharge panel openably and closably connected to a portion of a bottom surface of the roasting kettle, an actuating member connected to a bottom of the discharge panel to guide pivoting of the discharge panel, a solenoid valve driving the actuating member, and a spring providing elastic restorative force toward the discharge panel, the bean discharger discharging roasted beans.

According to an embodiment of the present disclosure, the roasting kettle may include: stirring protrusions provided on a bottom surface and an inner circumferential surface of the roasting portion to come into contact with green beans during roasting; and a skin discharge-hole provided in a portion of the bottom surface, allowing skins peeled from green beans during roasting to be discharged therethrough.

According to an embodiment of the present disclosure, an inclined portion may be provided on a bottom surface of the roasting housing. The inclined portion is inclined downward from a central portion, on which the stirrer is provided, toward a portion in which the skin discharge-hole is provided.

According to an embodiment of the present disclosure, the roasting kettle further includes a spring-fixing plate below the bottom surface, one end of the spring of the bean discharger being fixed to the spring-fixing plate.

According to an embodiment of the present disclosure, the roasting cover includes a cooling frame provided on a bottom portion and connected to the cooler to supply cold air and an opening and closing frame provided on a top portion, with a smoke remover being rotatably connected to the opening and closing frame.

According to an embodiment of the present disclosure, the stirrer may include: a stirring shaft rotating at a enter of the roasting portion; a stirring blade connected to the stirring shaft to stir green beans; a stirring motor provided below the roasting kettle to rotate the stirring shaft; and a buffer absorbing vibration produced in response to rotation of the stirring motor and the stirring shaft.

According to an embodiment of the present disclosure, the discharge panel may include a fixing portion on a bottom surface, with the actuating member being fixedly connected to the fixing portion, and a pivoting portion provided at rear of the fixing portion, with pivot being inserted into the pivoting portion to pivotably connect the discharge panel to the roasting housing.

According to an embodiment of the present disclosure, the bean discharger further includes a transport frame accommodating roasted beans put thereto in response to operation of the discharge panel and transporting roasted beans to a bean storage.

Advantageous Effects

According to an embodiment of the present disclosure, the heating member is embedded in the heating-hole provided in the roasting kettle to heat the roasting kettle during the roasting of green beans. This can significantly reduce a green bean roasting time, thereby enabling more efficient roasting.

In addition, according to an embodiment of the present disclosure, the skins of green beans peeled during the roasting of green beans can be automatically discharged, so that green beans can be roasted, with the skins being separated therefrom. Consequently, green beans can be uniformly roasted.

BEST MODE

An apparatus for roasting green beans includes:

a roasting kettle having a roasting portion in an internal portion thereof, wherein green beans are roasted in the roasting portion;

a heating member embedded in a heating-hole provided in the roasting kettle and integrated with roasting kettle, the roasting kettle heating the roasting kettle during roasting; and a stirrer rotatably disposed within the roasting kettle to stir green beans during roasting.

MODE FOR INVENTION

Figure 1:
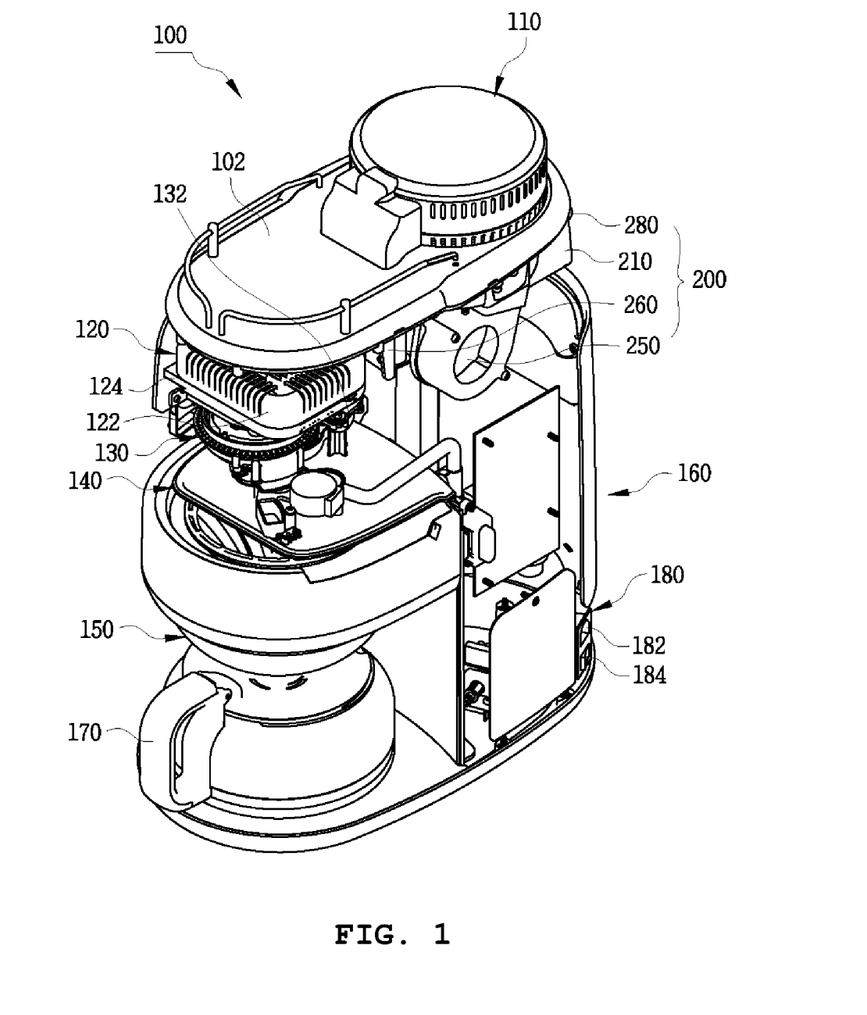
FIG. 1 is a perspective view illustrating a coffee machine to which embodiments of the present disclosure are applicable.

As illustrated in FIG. 1, a coffee machine 100 including an apparatus for roasting green beans according to embodiments of the present disclosure is an apparatus for roasting and grinding green beans and extracting coffee by supplying an amount of water to ground beans. The coffee machine 100 includes a smoke remover 110, a roasting apparatus 200, a bean storage 120, a bean grinder 130, a supply panel 140, a coffee extractor 150, and a machine driving unit 180.

The smoke remover 110 is connected to the op portion of the roasting apparatus 200 to exhaust smoke produced during roasting. A smoke-removing means comprised of two or more rows of Nichrome wires is provided within the smoke remover 110.

The bean storage 120 includes a bean container 122 and a cooler. The bean container 122 is a component connected to the roasting apparatus 200 to store roasted beans therein. The cooler is provided above the bean container 122 and connected to a top frame 102 to lower the temperature of beans stored in the bean container 122.

In the coffee machine 100, the bean grinder 130 is provided below the bean storage 120, and includes a grinding actuator 132 able to grind green beans to extract coffee. The supply panel 140 is provided below the bean grinder 130 to supply ground beans and water to extract coffee using the ground beans. The coffee machine 100 further includes a water tank 160 connected to the supply panel 140 to supply an amount of water.

In addition, the coffee extractor 150 for extracting coffee from beans and water, supplied thereto through the supply panel 140, and a coffee container 170 for storing the extracted coffee are provided below the supply panel 140.

In addition, the machine driving unit 180 for controlling operations of the coffee machine 100, such as operations of roasting and grinding beans and extracting and storing coffee, may be provided in a portion of the coffee machine 100. The machine driving unit 180 includes a power connector 182 by which power is supplied, a driving switch 183 by which the supply of power is controlled, and an extraction controller (not shown) controlling a time for which green beans are roasted, a roasting temperature, the degree of grinding of green beans, an amount of coffee to be extracted, a concentration of coffee, and the like.

The roasting apparatus 200 according to an embodiment of the present disclosure is a component connected to a bottom of the top frame 102 of the coffee machine. The roasting apparatus 200 roasts green beans supplied through an opened top portion. The smoke remover 110 is connected to the top portion such that the top portion can be opened and closed.

Figure 2:
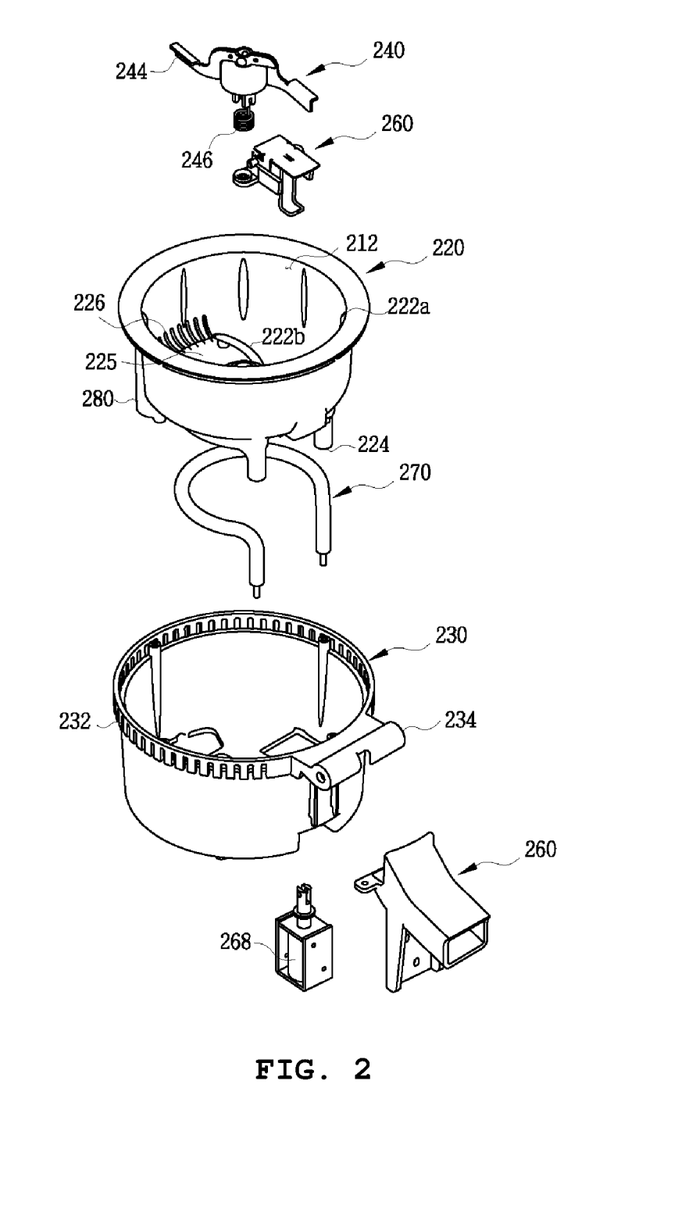
FIGS. 2 and 3 are perspective views illustrating an apparatus for roasting green beans according to an embodiment of the present disclosure.
Figure 3:
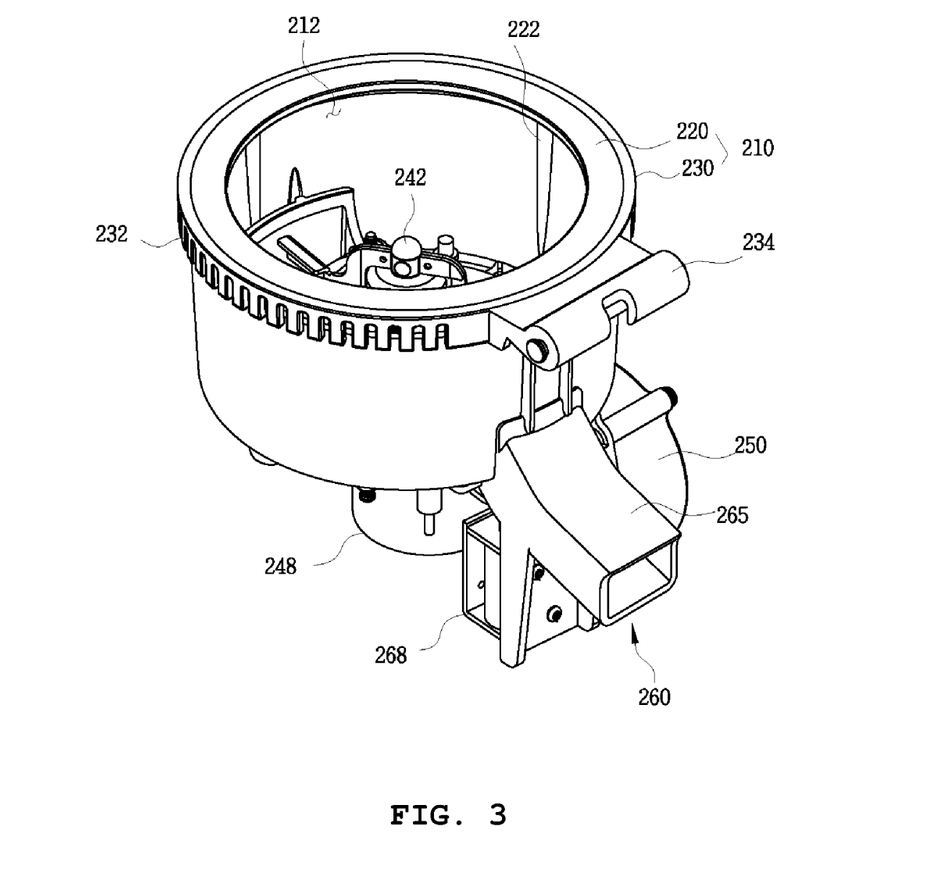
Figure 4:
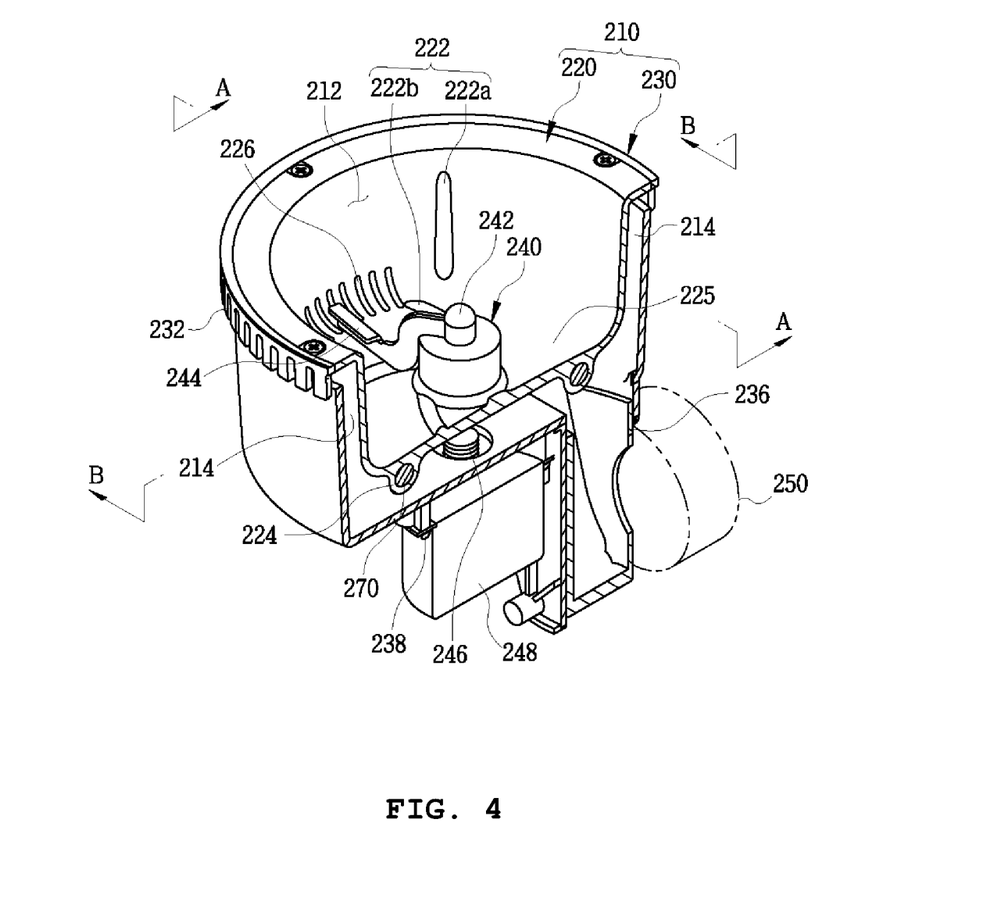
FIG. 4 is a cutaway perspective view illustrating the apparatus for roasting green beans according to the embodiment of the present disclosure.
Figure 5:
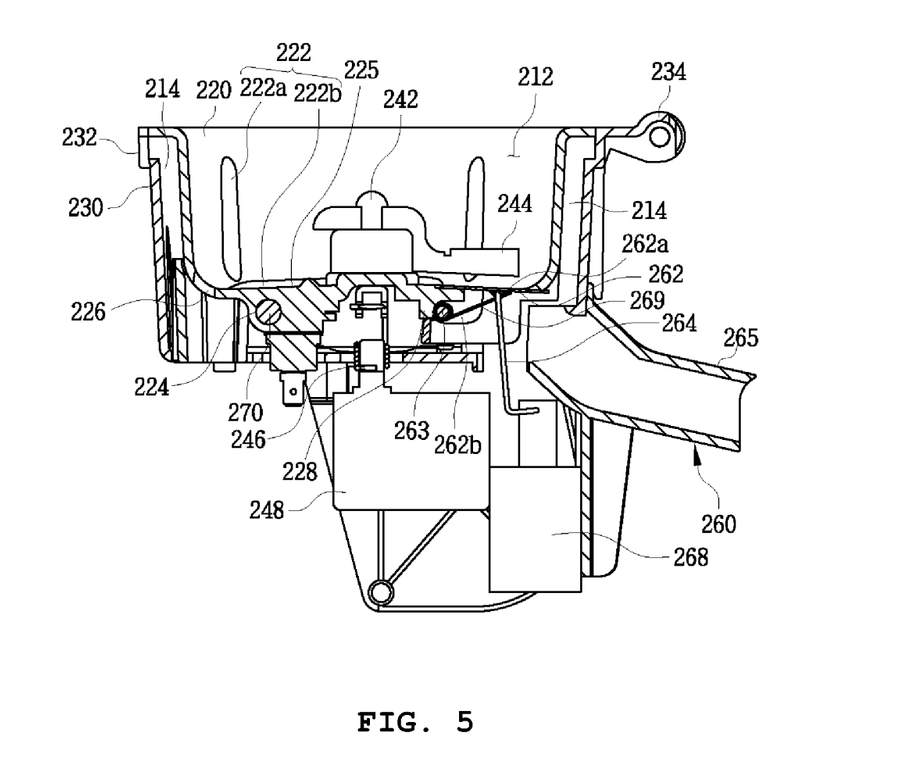
FIG. 5 is a cross-sectional view illustrating the apparatus for roasting green beans according to the embodiment of the present disclosure, taken along line A-A'.
Figure 6:
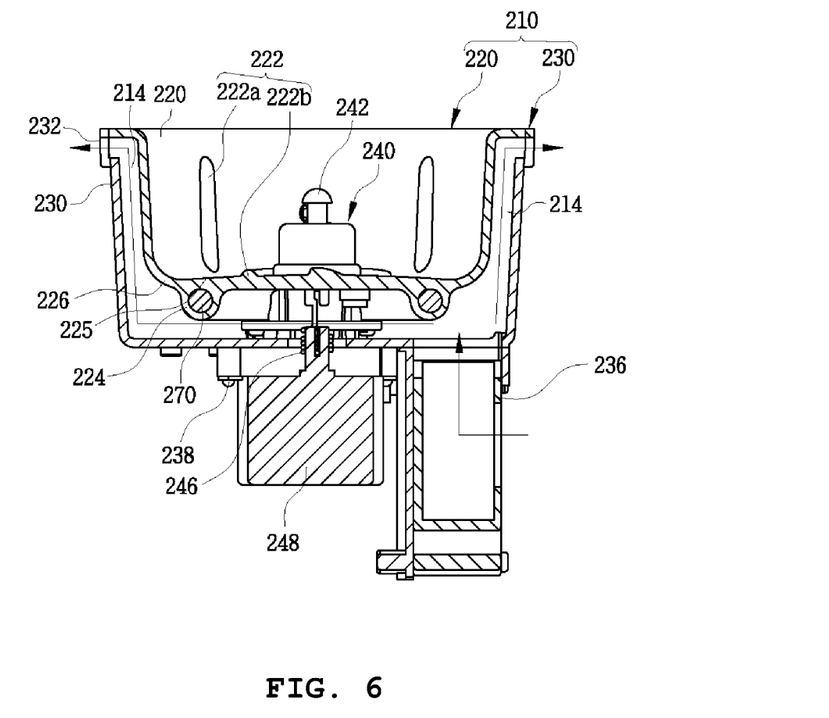
FIG. 6 is a cross-sectional view illustrating the apparatus for roasting green beans according to the embodiment of the present disclosure, taken along line B-B'.

The roasting apparatus 200 includes a roasting kettle 220, a stirrer 240, a cooler 250, and a bean discharger 260. The roasting kettle 220 is openably and closably connected to the smoke remover 110. The roasting kettle 220 has a roasting portion 212 in an internal portion thereof, the roasting portion allowing green beans to be roasted therein. The stirrer 240 is provided within the roasting kettle 220 to stir green beans contained in the roasting portion 212. The cooler 250 is configured to cool the roasting kettle 220 in which roasting has been completed. The bean discharger 260 is configured to discharge roasted beans to the bean storage 120.

The roasting kettle 220 is provided below the top frame 102 and connected to the smoke remover 110, with the top portion thereof being opened, such that smoke can be removed while beans are being roasted. The roasting kettle 220 is provided with the roasting portion 212 in the internal portion thereof, into which green beans are input. In response to the operation of the stirrer 240, green beans are stirred while being roasted. During this process, the skins of beans are separately peeled and discharged.

The outer circumferential surface of the roasting kettle 220 is surrounded roasting cover 230. The roasting cover 230 lowers the temperature by circulating cold air supplied by the cooler 250. A roasting housing 210 includes the roasting kettle 220 and the roasting cover 230.

The roasting portion 212 is provided with stirring protrusions 222 helping beans to be uniformly stirred by contact with beans stirred by the stirrer 240.

The stirring protrusions 222 include side stirring protrusions 222a elongated on inner wall surfaces of the roasting portion 212 in top-bottom direction and bottom stirring protrusions 222b provided on a bottom surface of the roasting portion 212 to extend toward the outer periphery.

The stirring protrusions 222 are provided around the center of the roasting portion 212 at predetermined distances from each other. The plurality of stirring protrusions 222 may radially arranged. In the stirring protrusions 222, a plurality of recesses may provided in outer circumferential surfaces, such that the skins of beans can be more easily peeled when in contact with the recesses.

In addition, skin discharge-holes 226 are provided in a surface portion of the roasting portion 212. The skin discharge-holes 226 allow the skins peeled from beans during roasting to be discharged therethrough in order to minimize smoke or the like, produced from the skins burned by heat generated during roasting.

The skin discharge-holes 226 are connected to a skin outlet 280 which only accommodates the skins of beans. The skin outlet 280 is separated from the coffee machine to remove the skins from the coffee machine. The widths of the skin discharge-holes 226 are smaller than the sizes of green beans to prevent green beans or roasted beans from passing through the discharge-holes 226.

Specifically, the skin outlet 280 is located below the skin discharge-holes 226, and is configured such that the skin outlet 280 can slide from the body of the coffee machine, so that the skins can be completely discharged.

In addition, the bottom surface of the roasting portion 212 has an inclined portion 225 inclined downward from the central portion, on which the stirrer 240 is provided, toward a portion in which the skin discharge-holes 226 are provided, such that the skins of green beans peeled during the roasting of green beans can move toward the skin discharge-holes 226 along the angle of incline of the inclined portion 225.

In addition, a heating-hole 224 is provided in the bottom surface of the roasting portion 212, and a heating member 270 is embedded in the heating-hole 224. Accordingly, the heating member 270 is provided integrally with the roasting kettle 220.

In the above-described roasting housing 210 according to the present disclosure, since the heating member 270 is embedded in the roasting kettle 220, the bottom surface can be uniformly heated to uniformly roast the entire surfaces of green beans. In addition, as roasting can be performed in a short period of time, the efficiency of bean roasting can be further improved.

In addition, the bean discharger 260 is openably and closably connected to a bottom surface of the roasting housing 210. The bean discharger 260 allows roasted beans to be discharged therethrough and transports roasted beans toward the bean storage 120.

Here, a spring-fixing plate 228 is further provided below the bottom surface to fix one end of a spring 269 of the bean discharger 260.

The top end portion of the roasting cover 230 is connected to the top end portion of the roasting housing 210 using a screw or the like. The roasting cover 230 is provided with a stirring support 238, on which a stirring motor 248 is mounted, to support the operation of the stirrer 240. The cooler 250 is mounted on a portion of the roasting cover 230. The roasting cover 230 is provided with a cold air circulation hole 214 and a cold air discharge hole 232, through which cold air supplied by the roasting cover 230 circulates and is discharged.

The cold air circulation hole 214 is provided as a space between the outer circumferential surface of the roasting housing 210 and the inner circumferential surface of the roasting cover 230, allowing cold air provided by the cooler 250 to circulate along the outer circumferential surface of the roasting housing 210 and be discharged through the cold air discharge hole 232.

The roasting cover 230 has a cooling frame 236 provided on a bottom portion and connected to the cooler 250, the cooling frame 236 allowing cold air to be supplied to the roasting cover 230. The roasting cover 230 is provided with an opening/closing frame 234 on a top portion, to which the smoke remover 110 is rotatably connected. The opening/closing frame 234 allows green beans to be input, in response to opening and closing operations of the smoke remover 110.

The stirrer 240 is disposed within the roasting kettle 210 to stir green beans input into the roasting portion 212, so that green beans can be uniformly roasted.

The stirrer 240 includes a stirring shaft 242 provided at the center of the roasting portion 212 to rotate in response to the operation of the stirring motor 248, a stirring blade 244 connected to the stirring shaft 242 to stir green beans, the stirring motor 248 located below the roasting kettle 220 and disposed on the roasting cover 230 to rotate the stirring shaft 242, and a buffer 246 absorbing vibration produced in response to the rotation of the stirring motor 248 and the stirring shaft 242.

Figure 7:
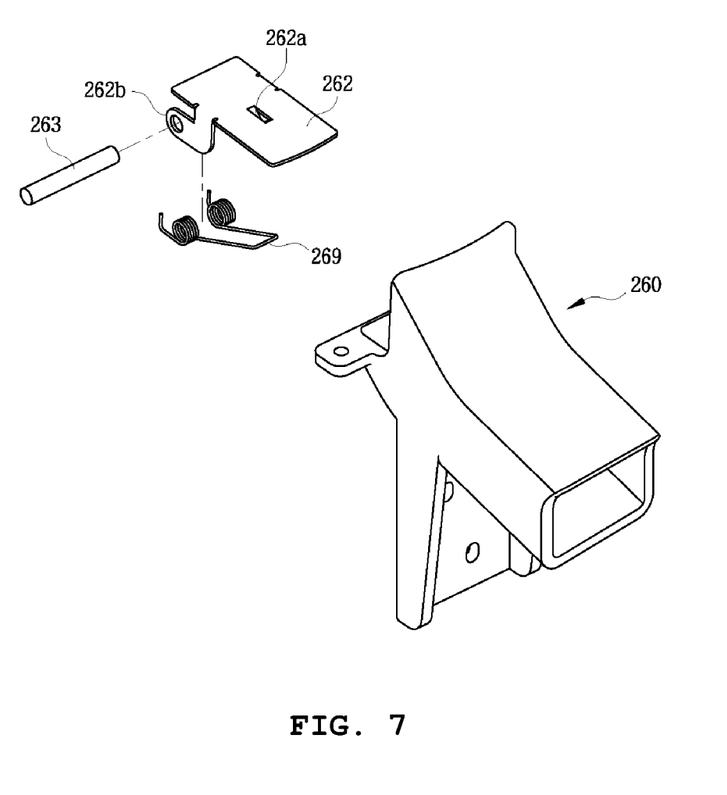
FIG. 7 is an exploded perspective view illustrating a bean discharge unit of the apparatus for roasting green beans according to the embodiment of the present disclosure.
Figure 8:
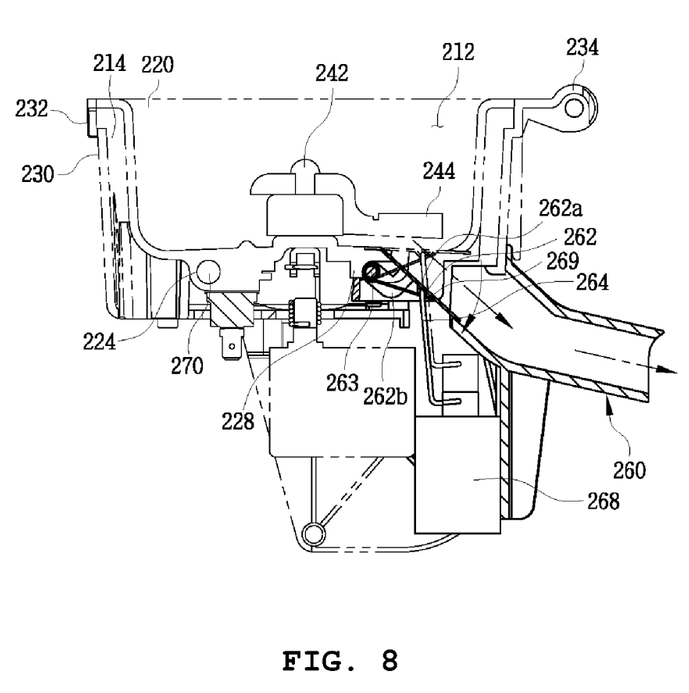
FIG. 8 is a view illustrating the operating status of the bean discharge unit of the apparatus for roasting green beans according to the embodiment of the present disclosure.

The bean discharger 260 is provided on an open portion of the bottom of the roasting housing 210 to close the portion of the bottom of the roasting housing 210 during roasting. When roasting is completed, the bean discharger 260 opens the portion of the bottom, so that roasted beans are transported to the bean storage 120.

The above-described bean discharger 260 includes a discharge panel 262 disposed in a hole in the bottom portion of the roasting housing 210 to open and close the hole, an actuating member 264 connected to the bottom of the discharge panel 262 to pivot the discharge panel 262 using force supplied thereto, a solenoid valve 268 providing the force to the actuating member 264 to move up and down, a pivot shaft 263 allowing the discharge panel 262 to rotate in response to the operation of the actuating member 264, and a transport frame 265 accommodating roasted beans input thereto and transporting the roasted beans to the bean storage 120.

Here, the discharge panel 262 has a fixing portion 262a on a bottom surface and pivoting portions 262b provided at the rear of the fixing portion 262a. The actuating member 264 is fixedly connected to the fixing portion 262a. The pivot shaft 263 is inserted into the pivoting portions 262b to pivotably connect the discharge panel 262 to the roasting housing 210.

The pivot shaft 263 is connected to the bottom surface of the roasting kettle 220. The pivoting portions 262b are provided on both edges of the discharge panel 262 to pivot along the outer circumferential surface of the pivot shaft 263.

That is, the discharge panel 262 is connected to the roasting kettle 220 to pivot about the pivot shaft 263 in response to the operation of the actuating member 264, thereby selectively open the hole in the bottom, so that beans are supplied to the transport frame 265.

The above-described bean discharger 260 may further include the spring 269. The spring 269 provides elastic restorative force to restore the discharge panel 262 to the original position, thereby closing the hole in the bottom of the roasting housing 210. During roasting, the spring 269 prevents the discharge panel 262 from pivoting, thereby preventing beans from being discharged.

According to an embodiment of the present disclosure, the heating member 270 is embedded in the roasting kettle 220 to provide uniform heat to the roasting kettle 220, more particularly, to the bottom of the roasting kettle 220. This can significantly reduce a time required for roasting green beans and enable more efficient roasting. In addition, since the skins peeled from green beans during roasting can be automatically discharged, roasting can be performed on green beans from which the skins have been separated, thereby enabling green beans to be uniformly roasted. This can further improve the taste and flavor of coffee.

INDUSTRIAL APPLICABILITY

Roasting can be performed more efficiently by significantly reducing a time required for roasting green beans. Since the skins peeled from green beans during roasting can be automatically discharged, roasting can be performed on green beans from which the skins have been separated, thereby enabling green beans to be uniformly roasted.

| 110: | Smoke remover | 120: | Bean storage |
| 130: | Bean grinder | 140: | Supply panel |
| 150: | Coffee extractor | 160: | Water tank |
| 170: | Coffee container | 180: | Machine driving unit |
| 200: | Roasting apparatus | 210: | Roasting housing |
| 220: | Roasting kettle | 230: | Roasting cover |
| 240: | Stirrer | 250: | Cooler |
| 260: | Bean discharger | 270: | Heating member |
| 280: | Skin outlet | | |

What is claimed is:

1. An apparatus for roasting green beans, comprising:
   a roasting housing comprising a roasting kettle having a roasting portion in an internal portion thereof, wherein the green beans are roasted in the roasting portion, and a roasting cover surrounding an outer circumferential surface of the roasting kettle to circulate and discharge cold air;
   a heating member embedded in a heating-hole provided in the roasting kettle and integrated with the roasting kettle, the heating member heating the roasting kettle during roasting;
   a cooler connected to a bottom portion of the roasting cover to provide cold air to cool the roasting housing;
   a stirrer rotatably disposed within the roasting kettle to stir the green beans during roasting; and
   a bean discharger comprising a discharge panel openably and closably connected to a portion of a bottom surface of the roasting kettle, an actuating member connected to a bottom of the discharge panel to guide pivoting of the discharge panel, a solenoid valve configured to drive the actuating member, and a spring configured to provide elastic restorative force toward the discharge panel, the bean discharger configured to discharge roasted beans,
   wherein the roasting cover comprises a cooling frame provided on a bottom portion and connected to the cooler to supply cold air and an opening and closing frame provided on a top portion, with a smoke remover being rotatably connected to the opening and closing frame.

2. The apparatus according to claim 1, wherein the roasting kettle comprises:
   stirring protrusions provided on the bottom surface and an inner circumferential surface of the roasting portion to come into contact with the green beans during roasting; and
   a skin discharge-hole provided in a portion of the bottom surface, allowing skins peeled from the green beans during roasting to be discharged therethrough.

3. The apparatus according to claim 2, wherein the roasting kettle further comprises a spring-fixing plate below the bottom surface, one end of the spring of the bean discharger being fixed to the spring-fixing plate.

4. The apparatus according to claim 1, wherein the discharge panel comprises a fixing portion on a bottom surface, with the actuating member being fixedly connected to the fixing portion, and a pivoting portion provided at a rear of the fixing portion, with a pivot shaft being inserted into the pivoting portion to pivotably connect the discharge panel to the roasting housing.

5. The apparatus according to claim 1, wherein the bean discharger further comprises a transport frame accommodating roasted beans input thereto in response to operation of the discharge panel and transporting the roasted beans to a bean storage.

6. An apparatus for roasting green beans, comprising:
   a roasting housing comprising a roasting kettle having a roasting portion in an internal portion thereof, wherein the green beans are roasted in the roasting portion, and a roasting cover surrounding an outer circumferential surface of the roasting kettle to circulate and discharge cold air;
   a heating member embedded in a heating-hole provided in the roasting kettle and integrated with the roasting kettle, the heating member heating the roasting kettle during roasting;
   a cooler connected to a bottom portion of the roasting cover to provide cold air to cool the roasting housing;
   a stirrer rotatably disposed within the roasting kettle to stir the green beans during roasting; and
   a bean discharger comprising a discharge panel openably and closably connected to a portion of a bottom surface of the roasting kettle, an actuating member connected to a bottom of the discharge panel to guide pivoting of the discharge panel, a solenoid valve configured to drive the actuating member, and a spring configured to provide elastic restorative force toward the discharge panel, the bean discharger configured to discharge roasted beans,
   wherein the stirrer comprises:
      a stirring shaft configured to rotate at a center of the roasting portion;
      a stirring blade connected to the stirring shaft to stir the green beans; and a stirring motor provided below the roasting kettle to rotate the stirring shaft, wherein a buffer absorbing vibration is produced in response to rotation of the stirring motor and the stirring shaft.

7. The apparatus according to claim 6, wherein the roasting kettle comprises:

stirring protrusions provided on the bottom surface and an inner circumferential surface of the roasting portion to come into contact with the green beans during roasting; and a skin discharge-hole provided in a portion of the bottom surface, allowing skins peeled from the green beans during roasting to be discharged therethrough.

8. The apparatus according to claim 7, wherein the roasting kettle further comprises a spring-fixing plate below the bottom surface, one end of the spring of the bean discharger being fixed to the spring-fixing plate.

9. The apparatus according to claim 6, wherein the discharge panel comprises a fixing portion on a bottom surface, with the actuating member being fixedly connected to the fixing portion, and a pivoting portion provided at a rear of the fixing portion, with a pivot shaft being inserted into the pivoting portion to pivotably connect the discharge panel to the roasting housing.

10. The apparatus according to claim 6, wherein the bean discharger further comprises a transport frame accommodating roasted beans input thereto in response to operation of the discharge panel and transporting the roasted beans to a bean storage.

\* \* \* \* \*